United States Patent
Albert et al.

[11] Patent Number: 6,058,993
[45] Date of Patent: May 9, 2000

[54] DEVICE FOR MACHINING, PREFERABLY SHAPING MACHINING, OF WORKPIECES OF WOOD, PLASTIC ETC. AND METHOD FOR ADJUSTING THE SPINDLE OF SUCH DEVICE

[75] Inventors: Adolf Albert, Grossrinderfeld-Gerlachsheim; Albrecht Dawidziak, Grossrinderfeld; Martin Horn, Neunkirchen; Hubert Klein, Wertheim-Nassig; Albin Körner, Grossrinderfeld; Rainer Kurz, Lauda-Königshofen-Gerlachsheim; Uwe Lindemann, Tauberbischofsheim-Distelhausen; Heinrich Englert, Lauda-Königshofen, all of Germany

[73] Assignee: Michael Weinig Aktiengesellschaft, Germany

[21] Appl. No.: 09/215,776

[22] Filed: Dec. 18, 1998

[30] Foreign Application Priority Data

Dec. 19, 1997 [DE] Germany .................. 197 56 498

[51] Int. Cl.⁷ .............. B23Q 15/00; B27B 1/00; B27C 1/00

[52] U.S. Cl. .............. 144/382; 144/117.1; 144/130; 144/357

[58] Field of Search .............. 144/114.1, 117.1, 144/116, 129, 130, 356, 357, 382

[56] References Cited

U.S. PATENT DOCUMENTS 5,152,329 10/1992 Browne et al. .............. 144/130

Primary Examiner—W. Donald Bray
Attorney, Agent, or Firm—Robert W. Becker & Associates

[57] ABSTRACT

A device for machining workpieces of wood or plastic has at least one spindle having a spindle axis and being moveable transverse to the spindle axis relative to a reference plane. A machining tool having cutting edges is provided. The machining tool is seated on the spindle. At least one measuring device is provided for correctly positioning the cutting edges relative to the reference plane. Correct positioning is achieved by moving the spindle in a direction transverse to the spindle axis and detecting by the measuring device a preset position of the cutting edges of the machining tool relative to the reference plane and generating a switch-off signal when the cutting edges of the matching tool are in the preset position.

25 Claims, 3 Drawing Sheets

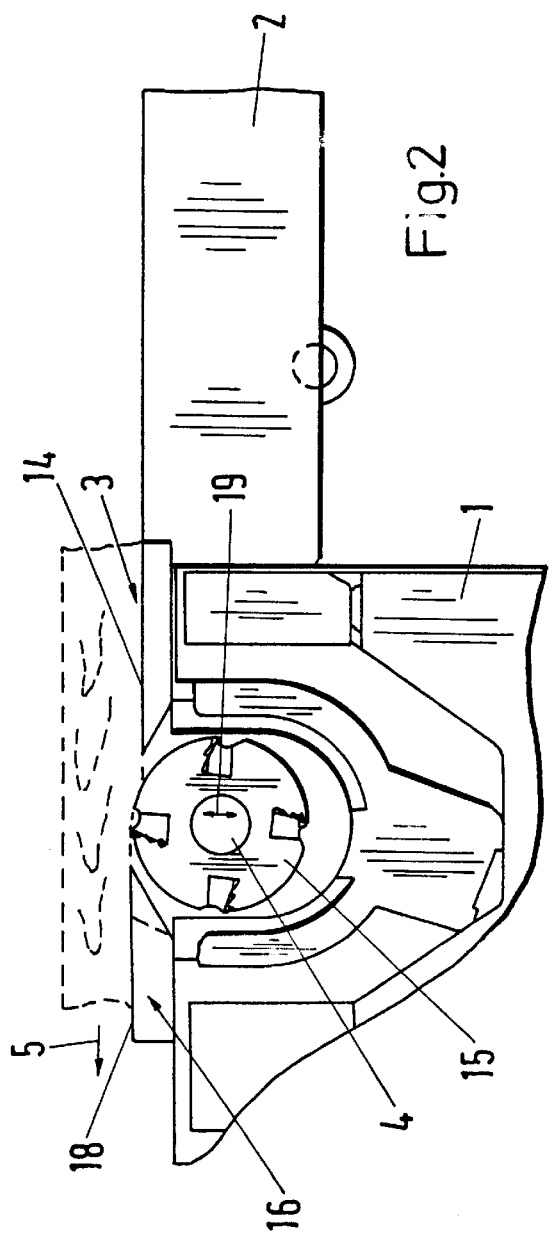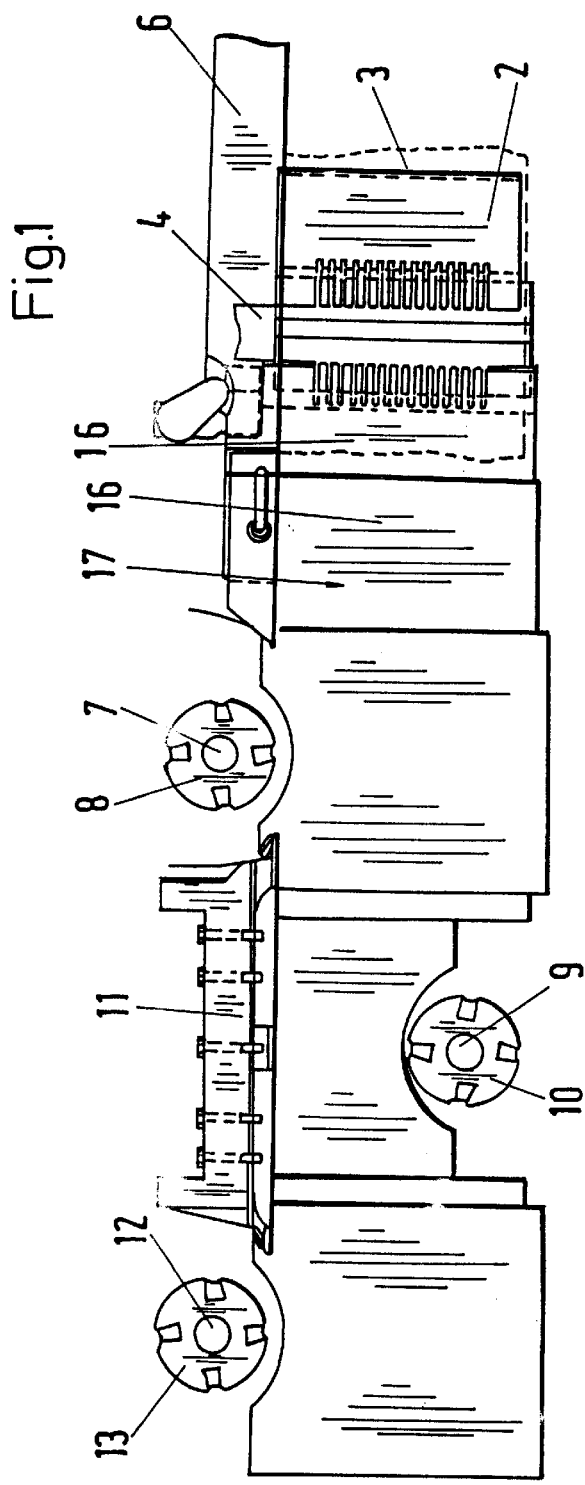

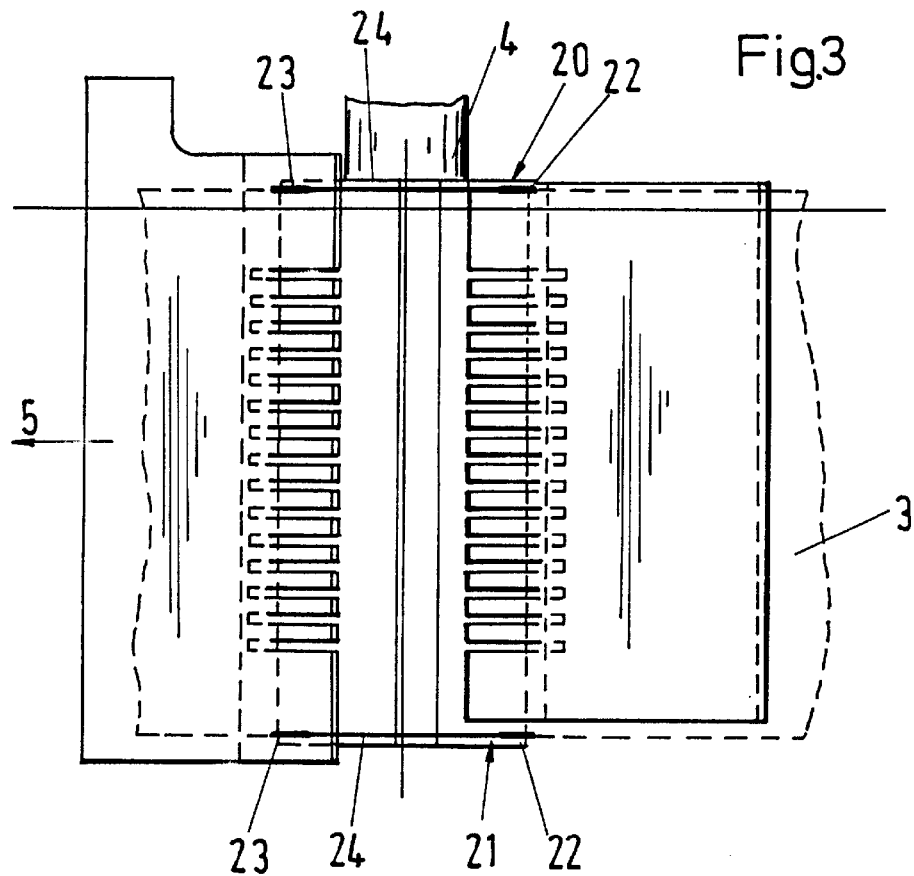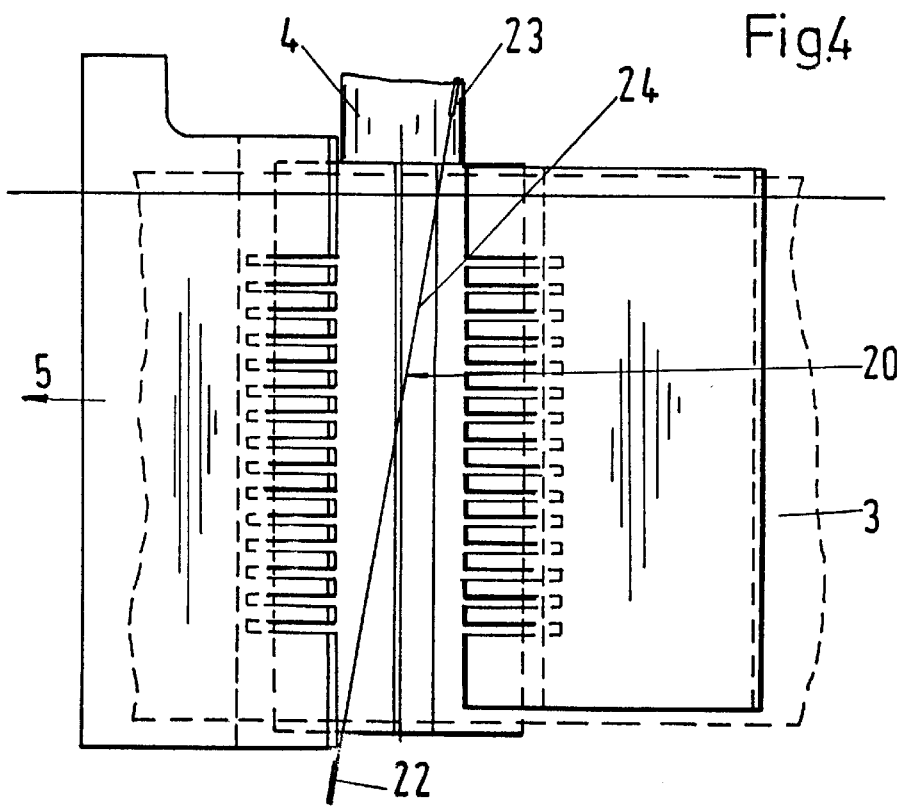

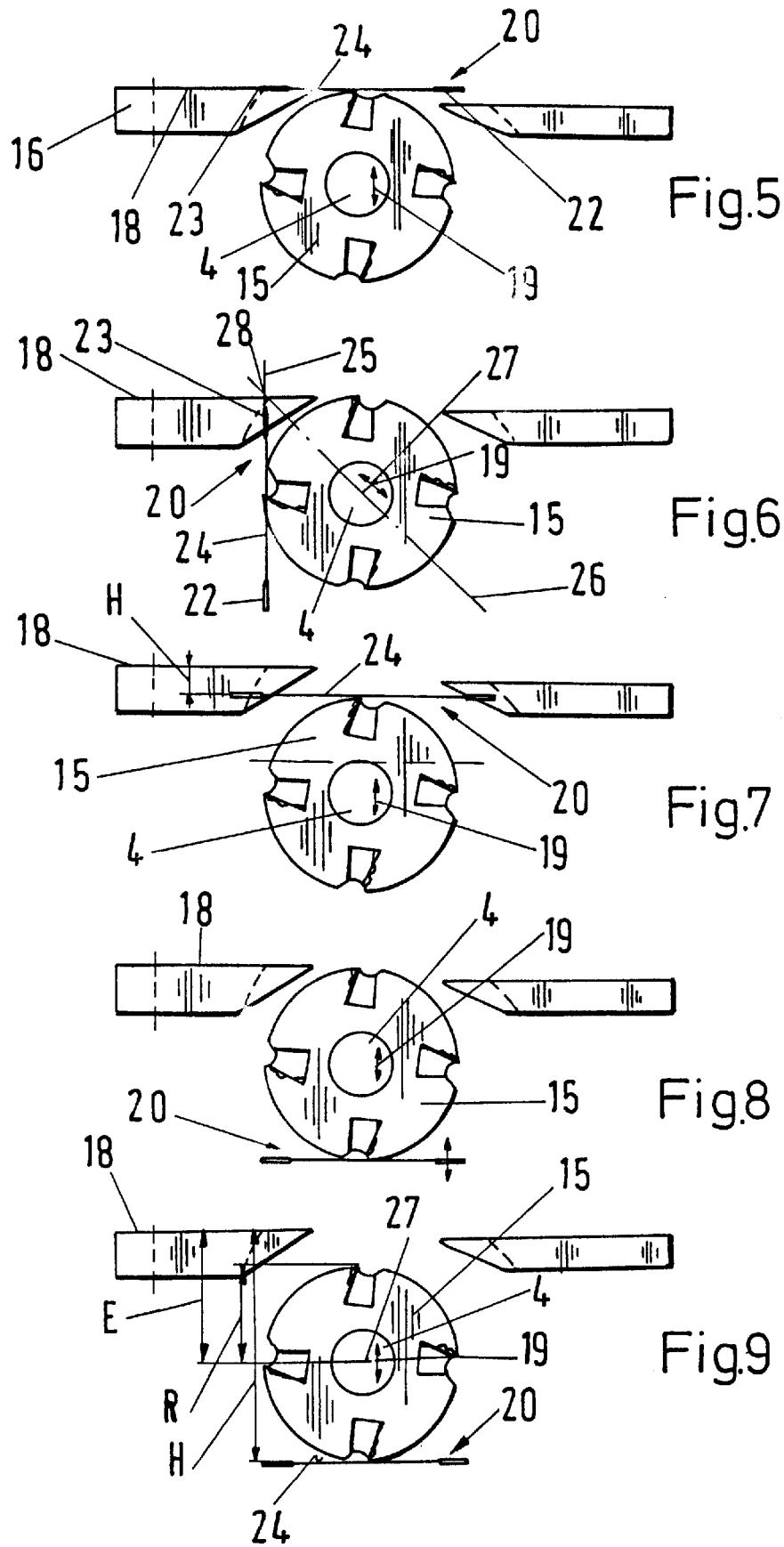

DEVICE FOR MACHINING, PREFERABLY SHAPING MACHINING, OF WORKPIECES OF WOOD, PLASTIC ETC. AND METHOD FOR ADJUSTING THE SPINDLE OF SUCH DEVICE

BACKGROUND OF THE INVENTION

The invention relates to a device for machining workpieces of wood, plastic etc, whereby the device is preferably a shaping machine, comprising at least one rotatably driven spindle which has seated thereon a machining tool with cutting edges and which is moveable transverse to its axis relative to a reference plane.

The present invention also relates a method for adjusting the spindle of such a device wherein the spindle is moved transversely to its axis relative to a reference plane.

Shaping machines are known in which workpieces comprised of wood are fed sequentially to different spindles on which machining tools are positioned. With these tools the workpieces are machined in the desired manner, for example, to produce window or door frames. The workpieces are guided on a machine table, along abutments and pressing elements. The cutting edges of the respective machining tools must be precisely adjusted relative to the machine table, the, and the support surfaces which respectively form reference surfaces. For this purpose, an adjustment of the spindle transverse to its axis is required. In order to do so, the drive of the spindle is switched off and the stopped spindle is manually or automatically moved into the desired position. The precise position of the adjusted spindle must be checked carefully by the operator. For this purpose, it is often necessary to run a test workpiece through the machine. Since such adjustments at the shaping machine must be preformed frequently, i.e., every time one of the tools is exchanged, redressed, sharpened, or when one of the tools becomes dull, considerable retooling times are required. Furthermore, after each adjustment at least one test run must be performed so that accordingly a considerable amount of rejects is produced.

It is therefore an object of the present invention to improve the aforementioned machine and aforementioned method such that the spindle can be adjusted quickly and precisely without requiring a test run of the workpiece through the machine after completion of adjustment.

SUMMARY OF THE INVENTION

The object of the invention is inventively solved for the device of the present invention by providing the device with at least one measuring device which allows positioning of the cutting edges of the machining tool relative to the reference plane.

The object is furthermore solved with respect to the method by adjusting the spindle to such an extent that by cooperation of the machining tool seated on the spindle and the measuring device a switch-off signal is produced when the cutting edges of the machining tool have reached a certain preset position relative to the reference plane.

In the inventive device and the inventive method the measuring device is used to precisely adjust the position of the spindle. The measuring device cooperates with the cutting edges of the machining tool seated on the spindle. As soon as the cutting edges of the machining tool have reached a preset position relative to the reference plane, preferably the table top, the measuring device will produce a switch-off signal that indicates to the operator to end the adjustment process performed manually or will shut off the adjustment motor of the spindle. The spindle thus remains in the desired position. Preferably, the switch-off signal is produced when the cutting edges of the machining tool interrupt a measuring beam of a sender/receiver system. In this manner, very short retooling times are possible so that an economic machining with the inventive device is possible. The measuring device allows a highly precise positioning of the spindle so that a subsequent test run is no longer required. The spindle must not be turned off for the adjusting process. The spindle can be easily adjusted while rotating.

BRIEF DESCRIPTION OF THE DRAWINGS

The object and advantages of the present invention will appear more clearly from the following specifications in conjunction with the accompanying drawings, in which;

FIG. 1 is a plan view onto a part of the inventive woodworking machine;

FIG. 2 is a front view of a portion of the inventive woodworking machine according to FIG. 1;

FIG. 3 is an enlarged representation of a measuring device which is provided in the area of the spindle of the woodworking machine of FIGS. 1 and 2;

FIG. 4 is a representation corresponding to FIG. 3 of a second embodiment of the measuring device;

FIGS. 5–9 show respective embodiments of the measuring devices at the spindle of a woodworking machine.

DESCRIPTION OF PREFERRED EMBODIMENTS

The present invention will now be described in detail with the aid of several specific embodiments utilizing FIGS. 1–9.

FIGS. 1 and 2 show a portion of a woodworking machine, preferably a shaping or molding machine. It comprises a machine stand 1 on which the dressing table 2 is arranged. On it the workpieces 3 of wood or plastic etc. are transported into the device. The machine stand 1 has arranged thereat also a machine table 17 which is comprised of individual table tops 16 on which the workpieces 3 are transported through the device. Non-represented transporting de vices are provided for this purpose, for example, in the form of feeding rollers which are rotatably driven and rest on the workpiece 3. With these rollers the workpiece 3 is guided across the machine table 17 and along the spindles on which the machining tools in the form of cutting heads with cutting edges are positioned with which the workpiece 3 is machined in the desired manner. As is shown in FIG. 1, the shaping machine has a lower horizontal dressing spindle 4 on which a cutting head is fixedly mounted. It planes the underside of the workpiece 3. The workpiece 3 rests during its transport in the direction of arrow 5 (FIG. 2) with its right side (in the transporting direction) at an elongate abutment 6.

In the transporting direction 5 downstream of the lower dressing spindle 4 at a spacing thereto a further vertically extending spindle 7 is provided at the right side of the shaping machine. A cutter head 8 is fixedly mounted on the spindle 7. The cutting edges of the cutter head 8 machine the right longitudinal side of the workpiece 3 during its passage through the shaping machine. The elongate abutment 6 ends at a spacing upstream of the cutting head 8. For adjusting a required cutting removal by the right machining tool 8, the abutment 6 is adjustable transverse to the transporting direction 5.

In the transporting direction 5, at a spacing downstream of the right spindle 7, a vertical left spindle 9 is provided on which a cutting head 10 is fixedly secured. Its cutting blades, preferably profiled blades, machine the left longitudinal side of the workpiece 3 when it passes through the shaping machine. The spindle 9 has positioned opposite thereto an abutment 11 extending in the transporting direction c on which the workpiece 3 rests with its right longitudinal side during machining by the cutting head 10 of the left spindle 9.

When the shaping machine, as shown in the embodiment, has a second right spindle 12, the abutment 11 is adjustable transverse to the transporting direction 5. The second right spindle 12 supports a cutting head 13 with corresponding cutting blades. In the transporting direction 5 downstream of the right hand spindle 12 a non-represented upper horizontal spindle may be provided with which the top side of the workpiece 3 is machined, preferably planed.

FIG. 2 shows in an exemplary manner how the workpiece 3 is machined at its under side 14 with the cutting head 15 seated on the horizontal lower spindle 4. The cuttings produced by machining the workpiece 3 are removed by suction in the downward direction in a manner known in the prior art. After machining by the cutting head 15, the workpiece 3 is thinner than before machining. This cutting removal is adjusted by adjusting the dressing table 2 transverse to the transporting direction 5. In FIG. 1, the workpiece 3 is shown in dashed lines with a width that corresponds to the maximum allowable width for the shown shaping machine.

As shown in FIG. 2, the cutting edges of the cutting head 15 seated on the dressing spindle 4 must be exactly adjusted relative to the reference surface 18 of the table top 16. This ensures that the workpiece 3 after machining by the cutting head 15 will be positioned with its underside 14 at the level of the support surface (reference surface) 18 of the table top 16 and will be planed exactly horizontally. Depending on the circle described by the tool 15, respectively, its edges, the spindle 4 must be adjusted in the vertical direction according double arrow 19 of FIG. 2. In order to completely automatically perform this adjustment in a very precise manner, the machining device is provided with at least one measuring device 20 (FIG. 3). In the following this measuring device 20 will be explained with the aid of the horizontal dressing spindle 4. Such measuring devices, however, can be provided for each one of the adjustable spindles of the machining device, preferably for the vertical right spindles and further lower spindles so that the required adjustment of the spindles can be performed simply and preferably automatically. For the vertically arranged right spindles the abutment surface arranged downstream provides the reference surface for adjusting the spindle while for the lower spindles the table top surface 18 arranged downstream provides the reference plane.

In the embodiment according to FIG. 3, two measuring devices 20 and 21 are provided for the dressing spindle 4 which measuring devices are of identical design. The measuring device 20, 21 are comprised respectively of a receiver 23 and a sender 22. The sender 22 and receiver 23 work according to the light barrier principle (photoelectric alarm), i.e., a beam 24 emitted by the sender 22 will impinge on the receiver 23 and interruption of the beam will cause a signal. The spindle 4 is adjusted in the vertical direction 19 until the cutting edges of the cutting head 13 interrupt this light beam 24. At this point in time the cutting edges of the cutting head are in the required position relative to the support surface 18 of the table top 16. The adjustment of the dressing spindle 4 can be carried out while the cutting head 15 rotates so that a fast adjustment of the dressing spindle 4 is ensured. The two measuring devices 20, 21 are positioned transverse to the transporting direction 5 on both sides of the working area of the cutting head 15 of the spindle 4. The beam 24 emitted by the sender 22 extends parallel to the transporting direction 5. For height adjustment of the dressing spindle 4 it is, of course, possible to provide only one measuring device 20. The use of two measuring devices 20, 21 has the advantage that it is possible to detect whether the cutting blades extend parallel to the table top surface. For this purpose, the measuring devices 20, 21 must have the same switching point.

In the embodiment according to FIG. 4, the beam 24 emitted by the sender 22 extends at a slant to the spindle axis, when viewed in a plan view onto the dressing spindle 4. When viewed in the transporting direction 5 of the workpiece 3, the sender 22 and the receiver 23 of the measuring device 22 are positioned on opposite sides of the working area of the cutting head 15 of the dressing spindle 4.

As in the previous embodiment, the beam 24 extends within a horizontal plane that contains the support surface 18. When the dressing spindle 4 is height-adjusted, the correct position has been found as soon as the edges of the rotating head 15 interrupt the beam 24. Then the advancing movement of the dressing spindle 4 in the vertical direction is immediately stopped.

FIG. 5 shows the measuring device 20 according to FIG. 3 viewed in the axial direction of the dressing spindle 4. The sender 22 and the receiver 23 are mounted such that they are exactly positioned within the reference plane which is in this case the support surface 18 of the table top 16. The support surface 18 is the plane of the table. The beam 24 extends horizontally in a plane which contains the support surface 18. When the dressing spindle 4 is adjusted in the vertical direction 19, the cutting edges of the rotating cutting head 15 seated on the dressing spindle 4 will interrupt the beam 24 at the exact required level. The measuring device 20 will then send a corresponding switching signal to the adjusting drive of the dressing spindle 4 so that the adjusting movement is instantly stopped. This adjustment of the dressing spindle 4 is carried out while the dressing spindle 4 is rotating so that the rotational drive must not be shut off for the height adjustment of the cutting head 15. Since the measuring device is arranged within the table plane 18, it must be positioned, as disclosed, outside of the transport path of the workpiece 3 or must be moveable into the table plane 18 only for the adjusting process, for example, by pneumatically operated clocked cylinders.

FIG. 6 shows the possibility to arrange the measuring device 20 perpendicularly to the reference plane, i.e., to the table plane 18. In this case, the beam 24 extends perpendicularly to the table plane 18. The adjustment of the dressing spindle 4 is carried out along a displacement axis extending at an angle of 45° to the reference plane 18. The measuring device 20 is mounted within the machine such that the cutting edges of the cutting head 15 seated on the dressing spindle 4 machine the workpiece 3 by the required amount at the underside 14 (FIG. 2). The measuring device 20 is arranged such that the beam axis 25 of the measuring beam 24 and the displacement axis 26, along which the axis 27 of the dressing spindle 4 is moved upon displacement, will intercept one another within the reference plane 18 (interception point 28). In this manner it is ensured that the adjustment at a 45° angle in the adjusting direction 19 will bring the cutting edges of the cutting head 15 into the correct position relative to the reference plane 18 when the beam 24 is interrupted by the cutting edges of the rotating cutting head 15. In this case, the interruption of the measuring beam 24 takes place in the area below the table plane and thus external to the transport path of the workpieces 3, in contrast to the previously disclosed embodiment where location of interruption is within the table plane.

In the embodiment according to FIG. 7, the measuring device 20 is positioned at a spacing H below the reference plane 18. The rotating spindle 4 is adjusted in a direction perpendicularly to the reference plane 18 in the direction 19 until the cutting edges of the cutting head 15 interrupt the measuring beam 24. The adjustment of the dressing spindle 4 is then stopped or a switching impulse is sent to the control unit. Since now the cutting blades of the cutting head 15 are positioned by the spacing H below the table surface 18, the dressing spindle 4 is then moved by the spacing H in the vertical direction 19. Now the cutting head 15 is in the exact desired position with respect to the reference plane 18. This adjustment of the cutting head 15 by the spacing H is preferably automatically performed by a motor, but can also be carried out manually and can be performed with the dressing spindle still rotating. The adjustment can also be performed by pneumatic cylinders with a fixedly set lifting movement H.

In the embodiment according to FIG. 8 the measuring device 20 is positioned on a side of the table plane 18 opposite the cutting head 15. The measuring device 20 is entrained by the cutting head 15, respectively, the dressing spindle 4. The displacement ratio in view of the ratio of diameter to radius of the cutting head 15 is 2:1. The dressing spindle 4 in the disclosed embodiment is adjusted in the vertical direction 19, respectively, perpendicularly to the reference plane 18. This ensures that the cutting edges of the cutting head 15 have the correct position relative to the reference plane 18 when the beam 24 is interrupted by the cutting edges of the rotating cutting head 15.

In the embodiment according to FIG. 9 the measuring device 20 is stationarily mounted on a side opposite the cutting head 15 relative to the reference plane 18. The measuring device 20 measures the cutting head 15 in the machine. The spacing of the measuring plane, i.e., the plane in which the measuring beam 24 extends, to the reference plane 18 is indicated by reference numeral H. Since the measuring device 20 is stationary, this spacing H is unchangeable. As soon as the cutting edges of the rotating cutting head 15 interrupt the beam 24 of the measuring device 20, the axis 27 of the dressing spindle 4 has the spacing E relative to the reference plane 18. Furthermore, FIG. 9 shows the spacing R which corresponds to the radius of the circle described by the cutting edges of the cutting head 15 and which results as the difference of the spacing H and E R=H−E. The dressing spindle 4 must now be moved perpendicularly to the reference plane 18 in the direction 19 until the spacing E is identical to the spacing R. In this position the cutting head 15 is exactly located relative to the table top 18. The spacing E is measured in a manner known to a person skilled in the art by a travel measuring system provided at the device.

In the disclosed embodiments the measuring beam 24 is in each case interrupted by the cutting edges of the rotating cutting head 15. The measuring device 20 can also be designed such that it measures the spacing to the cutting edges of the cutting head 15. In this case, the measuring beam emitted by the measuring device is oriented perpendicularly to the cutting head 15 in the direction onto the axis 27 of the dressing spindle 4. The measuring beam 24 reflected by the cutting head 15 is then received by the receiver of the measuring device and this signal is then used to determine the position of the cutting head 15 relative to the reference plane 18.

The measuring devices can also operate with sensors which do not operate by a light beam or reflection principle but according to other physical principles, for example, inductive or capacitive proximity switches, laser triangulation etc.

In the disclosed illustrated embodiments the measuring beam may be a laser beam, a direct light beam or a light beam generated by light guides etc. In the disclosed embodiments the adjustment can be performed while the cutting head is rotating at the rpm (revolutions per minute) required for machining. However, it is also possible to adjust the spindle and the tool while rotating at an rpm which deviates from the required machining rpm, preferably at a lower rpm or even for a stopped tool by using the measuring devices.

The specification incorporates by reference the disclosure of German priority document of DE 197 56 498.4 of Dec. 19, 1997.

The present invention is, of course, in no way restricted to the specific disclosure of the specification and drawings, but also encompasses any modifications within the scope of the appended claims.

What is claimed is:

1. A device for machining workpieces of wood or plastic, said device comprising:

at least one spindle having a spindle axis;

said spindle moveable transverse to said spindle axis relative to a reference plane (18);

a machining tool having cutting edges (15);

said machining tool seated on said spindle;

at least one measuring device (20, 21) for correctly positioning said cutting edges (15) relative to said reference plane (18);

wherein said measuring device (20, 21) comprises at least one sender (22) and at least one receiver (23), wherein said sender (22) emits a measuring beam (24) and wherein said cutting edges (15) are positioned in a path of said measuring beam (24).

2. A device according to claim 1, wherein said sender (22) and said receiver (23) are positioned opposite one another.

3. A device according to claim 1, wherein said measuring device (20, 21) is stationary.

4. A device according to claim 1, wherein said measuring device (20, 21) is moveable relative to said reference plane (18).

5. A device according to claim 1, wherein said measuring beam (24) extends at the level of said reference plane (18).

6. A device according to claim 1, wherein said measuring beam (24) extends in an area below said reference plane (18).

7. A device according to claim 1, wherein said measuring beam (24) extends horizontally.

8. A device according to claim 1, wherein said measuring beam (24) extends transversely to said reference plane (18).

9. A device according to claim 1, wherein said measuring beam (24) extends perpendicularly to said reference plane (18).

10. A device according to claim 1, wherein said spindle (4) is moveable on a displacement axis (26) extending perpendicularly to said spindle axis (25), wherein said displacement axis (26) extends at an angle of 45° to said reference plane (18).

11. A device according to claim 1, wherein said spindle (4) is moveable on a displacement axis extending perpendicularly to said spindle axis (25), wherein said displacement axis (26) and the beam axis (25) of said measuring beam (24) intercept one another in said reference plane (18).

12. A device according to claim 1, wherein said measuring device (20, 21) and said machining tool (15) are located on opposite sides of said reference plane (18).

13. A device according to claim 1, wherein said measuring device (20, 21) has inductive or capacitive proximity switches.

14. A method for position-adjusting said spindle (4) of said device according to claim 1, said method comprising the steps of:
   a) moving said spindle (4) in a direction transverse to said spindle axis;
   b) detecting by said measuring device a preset position of said cutting edges of said machining tool (15) relative to said reference plane (18);
   c) generating a switch-off signal when said cutting edges of said machining tool (15) are in said preset position.

15. A method according to claim 14, wherein said step b) includes producing a measuring beam (24) by said measuring device (20, 21) and wherein in said step c) said switch-off signal is produced when said cutting edges (15) interrupt said measuring beam (24).

16. A method according to claim 14, wherein in said step a) said spindle (4) is moved perpendicularly to said reference plane (18).

17. A method according to claim 14, wherein said preset position is a working position of said machining tool.

18. A method according to claim 14, further including the step of moving said machining tool (15) from said preset position into a working position.

19. A method according to claim 14, wherein in said step a) said spindle (4) is moved at a slant relative to said reference plane (18).

20. A method according to claim 14, wherein in said step a) said spindle (4) is moved at a 45° angle relative to said reference plane (18).

21. A method according to claim 14, wherein in said step a) said spindle (4) rotates while being moved.

22. A method according to claim 14, wherein said measuring device (20, 21) follows said machining tool (15) at a ratio of 2:1.

23. A method according to claim 14, further including the step of positioning said measuring device (20, 21) in said reference plane (18).

24. A method according to claim 23, wherein said measuring device (20, 21) is moved by clocked cylinders into said reference plane (18).

25. A device according to calim 1, wherein said sender (22) and said receiver (23) are positioned on a same side relative to said cutting edges (15) such that the measuring beam (24) is reflected at said cutting edges (15).

* * * * *

UNITED STATES PATENT AND TRADEMARK OFFICE
CERTIFICATE OF CORRECTION

PATENT NO : 6,058,993
DATED : May 9, 2000
INVENTOR(S): Adolf Albert, Albrecht Dawidziak, Martin Horn, Hubert Klein, Albin Körner, Rainer Kurz, Uwe Lindemann, and Heinrich Englert It is certified that error appears in the above-identified patent and that said Letters Patent are hereby corrected as shown below:

On title page, item should read as follows:

[54] Title:

DEVICE FOR MACHINING, PREFERABLY SHAPING MACHINING OF WORKPIECES OF WOOD, PLASTIC ETC. AND METHOD FOR ADJUSTING THE SPINDLE OF SUCH DEVICE

Signed and Sealed this

Seventeenth Day of April, 2001

Attest:

NICHOLAS P. GODICI

Attesting Officer

*Acting Director of the United States Patent and Trademark Office*